(12) United States Patent
Li et al.

(10) Patent No.: US 10,827,680 B2
(45) Date of Patent: Nov. 10, 2020

(54) DEVICE AND METHOD FOR HARVESTING WIND-BORNE SEEDS OF WETLAND PLANT

(71) Applicant: Research Institute of Forestry New Technology, Beijing (CN)

(72) Inventors: Wei Li, Beijing (CN); Lijuan Cui, Beijing (CN); Zhiguo Dou, Beijing (CN); Xinsheng Zhao, Beijing (CN); Si Yang, Beijing (CN); Manyin Zhang, Beijing (CN); Changjun Gao, Beijing (CN); Yinuo Zhu, Beijing (CN)

(73) Assignee: RESEARCH INSTITUTE OF FORESTRY NEW TECHNOLOGY, CHINESE ACADEMY, Beijing (CN)

( * ) Notice: Subject to any disclaimer, the term of this patent is extended or adjusted under 35 U.S.C. 154(b) by 464 days.

(21) Appl. No.: 15/854,094

(22) Filed: Dec. 26, 2017

(65) Prior Publication Data
US 2019/0029183 A1    Jan. 31, 2019

(30) Foreign Application Priority Data
Jul. 26, 2017    (CN) .......................... 2017 1 0617847

(51) Int. Cl.
*A01D 46/00* (2006.01)
*A01D 51/00* (2006.01)
*A01D 93/00* (2009.01)

(52) U.S. Cl.
CPC .................................. *A01D 93/00* (2013.01)

(58) Field of Classification Search
CPC ........ A01D 46/00; A01D 46/26; A01D 93/00; A63B 69/00; A63B 71/022; A63B 63/00; A63B 61/00; D04B 21/10; D04B 21/20
USPC .... 56/329, 339, 340.1, 328.1; 473/490, 491, 473/492, 493, 494
See application file for complete search history.

(56) References Cited

U.S. PATENT DOCUMENTS

| | | | | |
|---|---|---|---|---|
| 816,186 | A | * | 3/1906 | Roberts |
| 3,616,629 | A | * | 11/1971 | Ooka ..................... A01D 46/26 56/299 |
| 4,901,513 | A | * | 2/1990 | Kim ........................ A01D 46/26 56/329 |
| 6,305,875 | B1 | * | 10/2001 | Matsumoto ............ D04B 21/10 405/16 |
| 6,630,414 | B1 | * | 10/2003 | Matsumoto .......... A47C 31/006 442/1 |
| 7,320,210 | B2 | * | 1/2008 | Straatmans ............ A01D 46/26 56/329 |

(Continued)

*Primary Examiner* — Robert E Pezzuto
(74) *Attorney, Agent, or Firm* — Stuart H. Mayer; Mayer & Williams PC

(57) ABSTRACT

A plant seed harvesting device comprises a multi-layer net unit; the multi-layer net unit comprises collecting net, intermediate layer net and bottom layer net; the collecting net, the intermediate layer net and the bottom layer net are all plate-like structure having a plurality of meshes; the peripheral edge of the plate-like structure is a net frame, area with the meshes is net face; The collecting net, the intermediate layer net and the bottom layer net are arranged closely in the axial direction to form the multi-layer net unit; mesh sizes on the collecting net, the intermediate layer net and the bottom layer net are configured to be successively and gradually decreased; plant seeds can pass through the meshes of the collecting net; air but not plant seeds can pass through the meshes of the bottom layer net.

14 Claims, 1 Drawing Sheet

(56) References Cited

U.S. PATENT DOCUMENTS

| | | | |
|---|---|---|---|
| 8,216,093 B2 * | 7/2012 | Chen .................... | A63B 61/02 |
| | | | 473/490 |
| D727,694 S * | 4/2015 | Johnson, Sr. .................... | D8/1 |
| 9,526,207 B2 * | 12/2016 | Thelen .................... | A01D 46/26 |
| 2006/0272196 A1 * | 12/2006 | Safwat .................... | A01K 75/00 |
| | | | 43/9.95 |
| 2017/0238524 A1 * | 8/2017 | Brugh .................... | A01K 37/00 |

* cited by examiner

DEVICE AND METHOD FOR HARVESTING WIND-BORNE SEEDS OF WETLAND PLANT

TECHNICAL FIELD

The present invention relates to the field of eco-engineering technology, and in particular to a device and method for harvesting wind-borne seeds of wetland plants.

BACKGROUND

Wetland plants generally refers to plants grown in a wetland environment. A broad sense of wetland plants are plants that grow in swamp, wetland, peatland, or waters of which water depth less than six meters. A narrow sense of wetland plants are plants that grow in intersection of water and land, and environments with wet soil or with shallow water accumulation. In addition to providing human raw materials, foods, ornamental flower, medicinal materials, etc., wetland plants can also play a key role in wetland ecosystem.

The wetland plants whose seeds can be spread with the wind are mainly emergent aquatic plants such as Gramineae, Typhaceae, such as *Phragmites australis, Triarrhena saccharifiora, Stipa capillata, Typha orientalis, Typha minima* and so on. Seeds of these plants are small; some are covered with glumes, from the anthers dropped to seed maturation, the inflorescence and other organs have no obvious color variation; some seeds are covered by peel, it is not easy to judge whether seed mature or not; so it often causes picking so early that the seeds are not ripe, or picking so late that the seeds have landed; this causes that ifs difficult to grasp picking time, and results in difficulties to get a lot of wetland plant seeds.

Therefore, it is very essential to use an appropriate equipment for harvesting wetland plant seeds.

In prior art, there are also a number of harvesting devices for plant seeds with different structure. For example, Chinese invention patent 201210104920.9 provides a device for capturing water sowing seeds of wetland plants, it comprises a upright, a rectangular vertical plate, a plurality of rectangular slabs, palm fiber strainers and rectangular boxes. On one of the wide sides along the length direction of rectangular vertical plate, a plurality of rectangular plates are set from top to bottom; one wide side on the thickness direction of the horizontally placed rectangular plates is connected with the rectangular vertical plate. One inclined rectangular frame is arranged on the upper long plate surface of each rectangular plate, and a plurality of rectangular frames are arranged in parallel; a wide side on thickness direction of rectangular frame set on the upper long plate surface of rectangular plate is connected with the wide side on the length direction of rectangular vertical plate; the other wide side on thickness direction of rectangular frame set on the upper long plate surface of rectangular plate is respectively connected with its corresponding upper long plate surface, and there is included angle between the lower long surface of each rectangular frame and the upper long plate surface of its corresponding rectangular plate; one palm fiber strainer is spread out over the upper long surface of each rectangular frame; border of each palm fiber strainer is connected with the periphery of its respectively-corresponding edge of the rectangular frame; the upper end of the upright is linked to bottom end of the other wide side of rectangular vertical plate.

Chinese inventive patent application 201210056871.6 discloses a capture device for wind seeding seeds of wetland plants, comprising a plastic bucket, aluminum foil, armyworm layer, wood pile and nylon rope, characterized in that: the capture device further comprises cystosepiment, fishing line and weights; the plastic bucket is arranged on the upper end surface of the cystosepiment, the aluminum foil is stuck on the upper end face on the bottom of the plastic bucket, the armyworm layer is set on the upper end face of the aluminum foil. One end of the fishing line is connected with the lower end of the plastic bucket by passing through the cystosepiment, and the other end of the fishing line is connected with the weights, and the plastic bucket is connected with the wood pile by the nylon rope.

The above-mentioned prior-existing devices have disadvantages that structural elements, consumptive materials are overused, the structure is complicated, the installation is troublesome, the cost is high, and some devices are unavailable for harvesting wind-borne seeds, or the harvested seeds enter the device can be easily blown out by the wind, and their germination rate is not high, which can not satisfy the universality requirement of harvesting wind-borne seeds with simpleness and efficiency. There is an urgent need in this field to develop a simple-structured, cost-effective, extensively-useful, high-efficient new device for harvesting wind-borne plant seeds, especially wetland plant seeds.

SUMMARY OF THE INVENTION

Based on the above-mentioned objective problems and requirements in prior art, the present invention provides an effective device and method for harvesting wind-borne seeds of wetland plants. The device is simple, easy to use, low cost and high germination rate of harvested seeds, and further lay a good foundation for artificial propagation of wetland plants.

The technical solution of this invention is as follows:

The present invention first provides a device for harvesting wind-borne plant seeds, characterized in that, said device comprises a multi-layer net unit; the multi-layer net unit comprises collecting net, intermediate layer net and bottom layer net; the collecting net, the intermediate layer net and the bottom layer net are all plate-like structure having a plurality of meshes; the peripheral edge of the plate-like structure is a net frame, area with the meshes is net face; The thickness of the net frame is larger than the thickness of the net face; the collecting net, the intermediate layer net and the bottom layer net are arranged closely in the axial direction to form the multi-layer net unit; mesh sizes on the collecting net, the intermediate layer net and the bottom layer net are configured to be successively and gradually decreased; the plant seeds can pass through the meshes of the collecting net; air but not plant seeds can pass through the meshes of the bottom layer net.

When the above-mentioned device is used to harvest plant seeds, plant seeds successively passes through the collecting net, the intermediate layer net and the bottom layer net through the action of the wind; the advantage of the close arrangement in the axial direction of each net is that: there is no gap on two sides of whole device, to prevent seeds that have entered the device from running out through gap on both sides of the device. The thickness of the net frame is greater than the thickness of the net face, to ensure that there is some space between net faces of each net when all nets are closely arranged in the axial direction, which not only provides buffer space for the movement of seeds that have blown into the device by wind, but also offers storage place for the seeds; the device described in this invention has advantages that, its structure is simple; consumptive materials, elements are easily-available; production cost is low; installation is easy, and it can effectively harvest plant seeds to ensure seed germination rate.

In some examples, a plurality of elastic hard fibers are provided at periphery of mesh of the collecting net; the elastic hard fibers stretch out towards the intermediate layer net, and they intersect the plane of net face of the collecting net with 15-30 degrees angle. The function of the dip angle configured of the elastic hard fibers on the collecting net on one hand is to accommodate seeds with different sizes so as that they can all pass through, on the other hand, is to prevent seeds from being blown out after wind direction changes. The structure that the elastic hard fibers intersect the plane of net face of the collecting net with some angle ensures that the plant seeds are not easily blown out by wind after being blown into the device, which plays the function of let wetland plant seeds enter into the device and prevent the wetland plant seeds from running out of the device, and ensures the number of harvested seeds and harvest efficiency.

In further examples, the plurality of elastic hard fibers are clustered and evenly distributed around each mesh of the collecting net; between each elastic hard fiber, as well as between elastic hard fibers and mesh periphery, there is interval, and the plant seeds can enter the device through said interval. These elastic hard fibers are arranged on each mesh of the collecting net, and they are clustered and evenly distributed around each mesh so that each mesh forms cone structure with interval whose top is towards the intermediate layer net; See the collecting net as a whole, all meshes on the entire collecting net are formed as said cone structure with interval; said interval does not stop seeds into the device, and makes seeds that are blown into the device by wind only in no out, so as to further overall ensure the number and efficiency of seeds harvested by the device of the present invention.

In further examples, the clustered elastic hard fibers are specifically 5-20 fibers per cluster; the distribution distance between each cluster of elastic hard fibers around the mesh of the collecting net is preferably 3 mm; and the elastic hard fiber is preferably nylon yarn; its length is preferably about 1 cm.

In other examples, the number of the intermediate layer net is one, two or more; the plurality of intermediate layer nets are closely arranged axially in series, the mesh sizes on each layer net are configured to be successively and gradually decreased on the direction from the collecting net to the bottom layer net. The number of intermediate layer nets of multi-layer net unit of the device of the present invention is optional. As seed sizes of wetland plants are different, intermediate layer nets with different mesh size can be replaced, so as to harvest different wetland plant seeds.

In some specific examples, as to the collecting net, the intermediate layer net, and the bottom layer net, sizes of meshes on each respective net are uniform; the sizes, shapes of the net frames of the collecting net, the intermediate layer net and the bottom layer net are matching each other, and there are through-holes set on the net frame of each net whose locations, sizes and shapes are corresponding; the collecting net, the intermediate layer net and the bottom layer net are fixedly connected with each other by using bolts or screws through the through holes to form the multi-layer net unit. This is only one of the implement solutions of said multi-layer net unit consisting of each net, and a person skilled in the art can also design other structure of closely and axially arrangement of the collecting net, the intermediate layer net, and the bottom layer net, according to the inventive concept of the present invention.

For example, in another concrete example, the multi-layer net unit may be manufactured as a box-like structure in which each net may be placed in a multi-layer net unit by means of inserting into, or be drawn out from multi-layer net unit. In particular, the multi-layer net unit is a cubic frame structure, and a plurality of slots are provided on the inner side of at least one side surface of the cubic frame; the slot width, the depth and the shape are configured to match the thickness of net frame of the collecting net, the intermediate layer net and the bottom layer net, which is for inserting the collecting net, the intermediate layer net and the bottom layer net; a structure of preventing the collecting net, the intermediate layer net and the bottom layer net from dropping out from the cubic frame is set on the bottom surface of the cubic frame, and the top surface of the cubic frame is openable.

In preferred examples, the device further comprises a holder; one end of the holder is fixed end for embedding underground to fix the entire device; the other end of the holder is free end for supporting the multi-layer net unit; after the multi-layer net unit is connected with the free end of the holder, the plane of net face of the collecting net, the intermediate layer net and the bottom layer net is ensured to be perpendicular to ground.

Further, the height of the holder can be adjusted.

In the most specific solutions comprising holder, said holder is tubular structure; the section near fixed end is inner tube, and the section near free end is outer tube; one end of said inner tube is said fixed end, and the other end is used for be sheathed into said outer tube; the tube wall of the inner tube and the outer tube is axially distributed with a plurality of through holes, through which the inner tube and the outer tube are connected by means of bolts/screws fixing, and the height of holder being adjustable is realized;

Preferably, the tubular structure is a stainless steel tube;

Preferably, the holder is bracket made of two stainless steel tubes.

In the most specific example, the thickness of net frame of the collecting net, the intermediate layer net and the bottom layer net are about 3 cm to 5 cm; material of the collecting net is plastic or plastic cement, and the radial width of the net frame is less than 3 mm; its mesh of the collecting net is square with side length of 1.5 cm; the intermediate layer net is made of metal, and its mesh is a square with side length of 1 mm-5 mm; the bottom layer net is made of metal or gauze, and its mesh is square with side length of less than 0.5 mm square.

Another aspect of the present invention also provides a method of harvesting wind-borne plant seeds, characterized in that, said device is used during harvesting. The device of this invention and the method for harvesting wetland plant seeds by using the device can obtain fully mature plant seeds without damaging the plant, at the same time, the seed harvesting efficiency as well as the seed quality are ensured, and the goal of cost reduction, simple implement and easy popularization is realized.

In specific examples, the plant is wetland plants; the device is mounted vertically in a wetland substrate and the height of the multi-layer net unit of the device is maintained consistent to the height of the wetland plant by adjusting the height of the holder. When the device or method of this invention is used to harvest wetland plant seeds, the device is placed vertically in the wetland substrate, and the height of the device is adjusted according to height of the wetland plants, in order to make the device substantially at a high level consistent with the plant height.

In more specific example, during the harvesting process, a plurality of said devices are mounted, and the side of the collecting net of said device is configured towards the direction of wind blowing as much as possible.

Compared with the conventional artificial harvesting seed method, the seed obtained by the method of this invention has high maturity and high germination rate. In addition, the device is set up once for permanent use. Compared with the artificial collection of seeds, as well as the prior existing device, method, the method and device of this invention has the following advantages: simple structure, simple production, low cost, more convenient to use, time saving and effort saving; because seeds harvested by the device of this invention are seeds which are natural mature off, so the seed germination rate is high. In general, the method of harvesting wetland plant seeds by using the device of the present invention is an effective way to further lay a good foundation for artificial reproduction of wetland plants.

EMBODIMENTS

The present invention will be further described in detail by combining the following specific embodiments, but it is not intended to limit the scope of the invention.

Examples Group 1: The Seed Harvesting Device of the Present Invention

Figure 2:
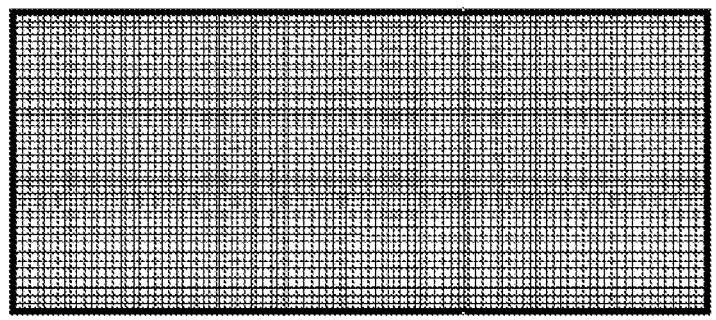
FIG. 2 is a schematic view of an intermediate layer net and a bottom layer net structure of multi-layer net unit of seed harvesting device provided by an embodiment of the present invention.

This group of examples provides a device for harvesting wind-borne plant seeds. In all examples of this group, said device has the following common characteristics: said device comprises a multi-layer net unit; the multi-layer net unit comprises collecting net, intermediate layer net and bottom layer net; as shown in FIG. 2, the collecting net, the intermediate layer net and the bottom layer net are all plate-like structure having a plurality of meshes; the peripheral edge of the plate-like structure is a net frame, area with the meshes is net face; The thickness of the net frame is larger than the thickness of the net face; the collecting net, the intermediate layer net and the bottom layer net are arranged closely in the axial direction to form the multi-layer net unit; mesh sizes on the collecting net, the intermediate layer net and the bottom layer net are configured to be successively and gradually decreased; such configuration corresponds to multi-layer mesh screening; seeds are blown by wind to pass through said nets successively, those that cannot pass through will be held up, in order to separate seeds with different sizes. The plant seeds can pass through the meshes of the collecting net; air but not plant seeds can pass through the meshes of the bottom layer net.

When the above-mentioned device is used to harvest plant seeds, plant seeds successively passes through the collecting net, the intermediate layer net and the bottom layer net through the action of the wind; the advantage of the close arrangement in the axial direction of each net is that: there is no gap on two sides of whole device, to prevent seeds that have entered the device from running out through gap on both sides of the device. The thickness of the net frame is greater than the thickness of the net face, to ensure that there is some space between net faces of each net when all nets are closely arranged in the axial direction, which not only provides buffer space for the movement of seeds that have blown into the device by wind, but also offers storage place for the seeds; the device described in this invention has advantages that, its structure is simple; consumptive materials, elements are easily-available; production cost is low; installation is easy, and it can effectively harvest plant seeds to ensure seed germination rate.

The ultimate aim of the device of the present invention is to increase the germination rate of the harvested seeds. Because the conventional collection method for seeds is artificial collection, it is difficult to determine the seed maturity, almost no fully mature seeds can be collected, and the artificial separation after collection will cause some damage to seeds. Seeds harvested by this device are completely ripe, fall off naturally, naturally captured, so seeds collected by the device of this invention are mature, and the seed germination rate is high.

In further examples, a plurality of elastic hard fibers are provided at periphery of mesh of the collecting net; the elastic hard fibers stretch out towards the intermediate layer net, and they intersect the plane of net face of the collecting net with 15-30 degrees angle. The function of the dip angle configured of the elastic hard fibers on the collecting net on one hand is to accommodate seeds with different sizes so as that they can all pass through, on the other hand, is to prevent seeds from being blown out when wind direction changes. The structure that the elastic hard fibers intersect the plane of net face of the collecting net with some angle ensures that the plant seeds are not easily blown out by wind after being blown into the device, which plays the function of letting wetland plant seeds enter into the device and preventing the wetland plant seeds from running out of the device, and ensuring the number of harvested seeds and harvest efficiency.

Figure 1:
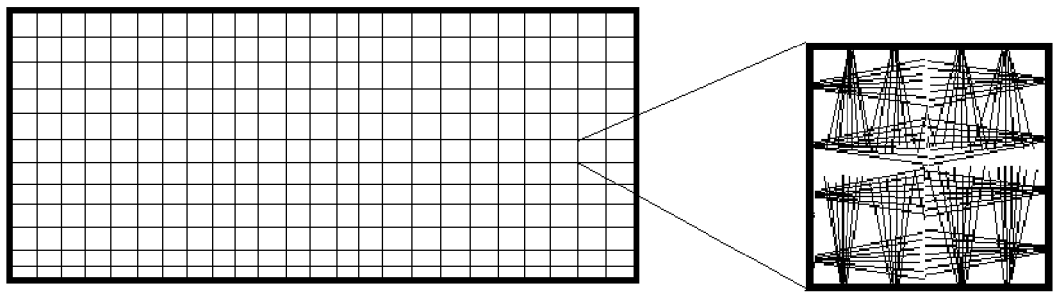
FIG. 1 is a schematic diagram of a collecting net structure of a multi-layer net unit for seed harvesting device provided by one embodiment of the present invention.

Further, as shown in FIG. 1, the plurality of elastic hard fibers are clustered and evenly distributed around each mesh of the collecting net; between each elastic hard fiber, as well as between elastic hard fibers and mesh periphery, there is interval, and the plant seeds can enter the device through said interval. These elastic hard fibers are arranged on each mesh of the collecting net, and they are clustered and evenly distributed around each mesh so that each mesh forms cone structure with interval whose top is towards the intermediate layer net; Seeing the collecting net as a whole, all meshes on the entire collecting net are formed as said cone structure with interval; said interval does not stop seeds into the device, and makes seeds that are blown into the device by wind only in no out, so as to further overall ensure the number and efficiency of seeds harvested by the device of the present invention.

Specifically, the clustered elastic hard fibers are specifically 5-20 fibers per cluster; the distribution gap between each cluster of elastic hard fibers around the mesh of the collecting net is preferably 3 mm; and the elastic hard fiber is preferably nylon yarn; its length is preferably about 1 cm.

In some examples, the number of the intermediate layer net is one, two or more; the plurality of intermediate layer nets are closely arranged axially in series, the mesh sizes on each layer net are configured to be successively and gradually decreased on the direction from the collecting net to the bottom layer net. Advantage of this configuration is that, according to sizes of target seeds required to be harvested, it's available to select net with different sized meshes, to separate seeds with different sizes. The number of intermediate layer nets of multi-layer net unit of the device of the present invention is optional. As seed sizes of wetland plants are different, intermediate layer nets with different mesh size can be replaced, so as to harvest different wetland plant seeds.

Figure 3:
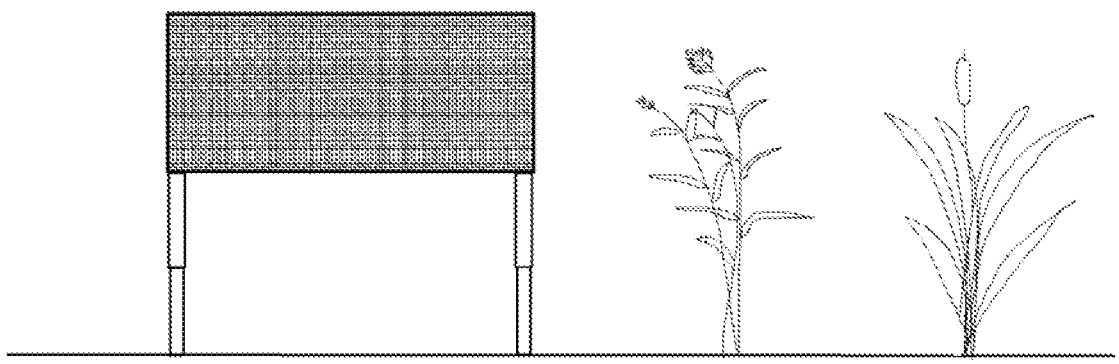
FIG. 3 is a schematic view of the overall structure of seed harvesting device provided by one embodiment of the present invention and the state of use for seed harvesting.

In a particular example, as to the collecting net, the intermediate layer net, and the bottom layer net, sizes of meshes on each respective net are uniform; and mesh shape of each net is not limited to square shown in FIGS. 1 to 3, it can also be round holes, rhombic holes of other shapes; sizes, shapes of the net frames of the collecting net, the intermediate layer net and the bottom layer net are matching each other, and there are through-holes set on the net frame of each net whose locations, sizes and shapes are corresponding; the collecting net, the intermediate layer net and the bottom layer net are fixedly connected with each other by using bolts or screws through the through holes to form the multi-layer net unit. This is only one of the implement solutions of said multi-layer net unit consisting of each net, and a person skilled in the art can also design other structure of closely and axially arrangement of the collecting net, the intermediate layer net, and the bottom layer net, according to the inventive concept of the present invention.

For example, in another specific example, the multi-layer net unit may be manufactured as a box-like structure in which each net may be placed in a multi-layer net unit by means of inserting into, or be drawn out from multi-layer net unit. In particular, the multi-layer net unit is a cubic frame structure, and a plurality of slots are provided on the inner side of at least one side surface of the cubic frame; the slot width, the depth and the shape are configured to match the thickness of net frame of the collecting net, the intermediate layer net and the bottom layer net, which is for inserting the collecting net, the intermediate layer net and the bottom layer net; a structure of preventing the collecting net, the intermediate layer net and the bottom layer net from dropping out from the cubic frame is set on the bottom surface of the cubic frame, and the top surface of the cubic frame is openable.

In preferred examples, the device further comprises a holder; one end of the holder is fixed end for embedding underground to fix the entire device; the other end of the holder is free end for supporting the multi-layer net unit; after the multi-layer net unit is connected with the free end of the holder, the plane of net face of the collecting net, the intermediate layer net and the bottom layer net is ensured to be perpendicular to ground.

In further examples, the height of the holder can be adjusted.

In one most specific example comprising a holder, said holder is tubular structure; the section near fixed end is inner tube, and the section near free end is outer tube; one end of said inner tube is said fixed end, and the other end is used for be sheathed into said outer tube; the tube wall of the inner tube and the outer tube is axially distributed with a plurality of through holes, through which the inner tube and the outer tube are connected by means of bolts/screws fixing, and the height of holder being adjustable is realized;

In one preferable example of holder, the tubular structure is a stainless steel tube;

In one other preferred example of the holder, the holder is a holder consisting of two stainless steel tubes. Of course, in other preferred examples, the holder may also be a bracket consisting of three stainless steel tubes, or even more stainless steel tubes.

In one most specific example of this group, the thickness of the net frame of the collecting net, the intermediate layer net and the bottom layer net is 3-5 cm, and material of the collecting net is plastic or plastic cement; the radial width of the net frame is less than 3 mm; the mesh is a square with side length of 1.5 cm; the intermediate layer net is made of metal. The intermediate layer net is made of metal, and its mesh is a square with a side length of 1 mm to 5 mm; the bottom layer net is made of material of metal or gauze, and its mesh is a square with a side length less than 0.5 mm.

In preferred examples of this group, the plant seeds are a wetland plant seeds. Structure of the device provided by one most preferred example of this group is shown in the following experimental example and FIG. 3.

Examples Group 2: The Seed Harvesting Method of the Present Invention

This group of examples provides a method of harvesting wind-borne plant seeds. In all examples of this group, the method has the following features: In the harvesting process, the device described in any of examples of group 1 is employed. The device of the invention and the method for harvesting the seed of the wetland plants by using the device can obtain the fully mature plant seed without damaging the plant, at the same time, the seed harvesting efficiency as well as the seed quality are ensured, the goal of cost reduction, simple implement and easy popularization is realized.

In some specific examples of this group, the plant seeds are wetland plant seeds; the device is mounted vertically in a wetland substrate, and the height of the multi-layer net unit of the device is maintained consistent to the height of the wetland plant by adjusting the height of the holder. When the device or method of this invention is used to harvest wetland plant seeds, the device is placed vertically in the wetland substrate, and the height of the device is adjusted according to height of the wetland plants, in order to make the device substantially at a high level consistent with the plant height.

In other more specific examples of this group, a plurality of said devices are installed during the harvesting process, and the side of the collecting web of said device is configured towards the direction of wind blowing as much as possible;

The device is mounted on the shore of the wetland.

The method and the operation process provided by one most specific example of this group of examples can be referred to the contents described in the following experimental example.

Experimental Example: Seeds Collection on the Spot by Using the Device of this Invention In the Beijing Hanshi Bridge Wetland Nature Reserve artificial wetland, the device provided by any of group 1 of examples was embedded into wetland substrate respectively in mount point selected in pool No. III of *Typha orientalis* growth area and pool No. IV of *Phragmites australis* growth area. The specific situation of the seed harvesting device in pool No. III of *Typha orientalis* growth area is: the height of the holder is 1.5 m; the length side of the multi-layer net unit is 3 m, and its width side is 1 m; the collecting net of multi-layer net unit is made of plastic material; its width of the net frame is 3 mm; its mesh is square with side length of 1.5 cm; the length of nylon fiber is 1 cm, and there are 10 nylon fibers per cluster, with spacing between each cluster of 3 mm; and nylon fiber cluster is tied up to net frame which intersects with the plane of square mesh of 15 degrees angle; the number of the intermediate layer net of multi-layer net unit is two, of which side length of mesh on one layer closing to the collecting net is 5 mm, and side length of mesh on one layer closing to the bottom layer net is 2 mm. The specific condition of seed harvesting device in *Phragmites australis* growing area of NO. IV pond is: height of the holder is 1.8 m; the length side of multi-layer net unit is 3 m, and its width side is 1 m. The multi-layer net unit is made of plastic material; the width of the net frame is 3 mm, and the mesh is square with side length of 1.5 cm; the length of nylon fiber is 1 cm, and there are 10 nylon fibers per cluster, with spacing between each cluster of 3 mm; and nylon fiber cluster is tied up to net frame which intersects with the plane of square mesh of 15 degrees angle; the number of the intermediate layer net of multi-layer net unit is three, of which side length of mesh on one layer closing to the collecting net is 5 mm; side length of mesh on the middle layer is 3 mm, and side length of mesh on one layer closing to the bottom layer net is 2 mm.

Maturity of plant seeds of *Typha angustifolia* and *Phragmites australis* was observed during their mature abscission stage.

After seeds of the two wetland plants *Typha angustifolia* and *Phragmites australis* matured and fell off, the intermediate layer net of multi-layer net unit of said device was taken out, and seeds of *Typha angustifolia* and *Phragmites australis*were collected through brushing by using brush.

Compared with the conventional method of harvesting plant seeds of artificial wetland plants, the seed capture device of the present invention can obviously improve germination rate of the collected seeds, since the conventional method adopted at present, taking into account that, after plant seeds (wetlands plant seeds) matured, they will naturally fall off, especially wetland plants; seeds naturally fallen off into the wetlands, resulting in that late collection is very difficult, and seeds suffer loss. Thus, if the conventional method is used, only the wetland plant seeds before maturity can be collected, however, the maturity of the seeds cannot be guaranteed; generally, seed maturity is quite critical for the subsequent seed germination rate, for example, some plant seeds may germinate as their maturation degree reaches about 80%, while some seeds only commendably germinate as their maturation degree reaches about 90%, especially for wetland plant seeds. Therefore, when the conventional methods are used to collect seeds, ifs required that technician estimates seed maturity degree by visual observation, and further decides whether to collect seeds; such artificial judgment based on experience commonly leads to errors, and results in that the collected seeds cannot guarantee complete maturity, further to make the seed germination rate is low. Use of the device and method of this invention is a good way to avoid this problem. The device is installed on the wetland shore, after the wetland plant seeds mature, some wind-borne seeds spread around along with wind, part of them will enter the device of this invention, so as to ensure that seeds captured by said device are completely mature, and further ensure the seed germination rate. In addition, using the device and method of the invention no longer need to rely on artificial collection, which has advantages of saving time and effort, saving time, convenient and quick.

The device and method of the present invention are also applicable to collect seeds of other plants besides wetland plants, and similarly, seeds of other plants obtained by said device and method of this invention can also achieve a higher germination rate.

It's verified through experiments that, the seeds collected by the device and method of this invention were cultivated, the germination rate of the plant seeds was observed and counted. The statistical results showed that the germination rate was above 95%.

The invention claimed is:

1. A device for harvesting wind-borne plant seeds, comprising a multi-layer net unit;

said multi-layer net unit comprising a collecting net, an intermediate layer net and a bottom layer net; the collecting net, the intermediate layer net and the bottom layer net are all plate-like structure having a plurality of meshes; a peripheral edge of the plate-like structure is net frame, and an area where the meshes are located is net face; the thickness of the net frame is larger than the thickness of the net face; the collecting net, the intermediate layer net and the bottom layer net are arranged closely in an axial direction to form the multi-layer net unit; mesh sizes on the collecting net, the intermediate layer net and the bottom layer net are configured to be successively and gradually decreased; the plant seeds can pass through the meshes of the collecting net; air but not plant seeds can pass through the meshes of the bottom layer net; a plurality of elastic hard fibers are provided at a periphery of the mesh of the collecting net; the elastic hard fibers stretch out towards the intermediate layer net, and they intersect a plane of the net face of the collecting net with a 15-30 degrees angle.

2. The device according to claim 1, wherein the plurality of elastic hard fibers are clustered and evenly distributed around each mesh of the collecting net; there is interval between each elastic hard fiber, as well as there is interval between the elastic hard fibers and mesh periphery, and the plant seeds can enter the device through said interval.

3. The device according to claim 2, wherein the clustered elastic hard fibers are specifically 5-20 fibers per cluster.

4. The device according to claim 1, wherein the number of the intermediate layer net is at least one; the plurality of intermediate layer nets are closely arranged axially in series, the mesh sizes on each layer net are configured to be successively and gradually decreased on the direction from the collecting net to the bottom layer net.

5. The device according to claim 1, wherein as to the collecting net, the intermediate layer net, and the bottom layer net, sizes of meshes on each respective net are uniform;

the sizes and shapes of the net frames of the collecting net, the intermediate layer net and the bottom layer net are matching each other, and there are through-holes set on the net frame of each net whose locations, sizes and shapes are corresponding; the collecting net, the intermediate layer net and the bottom layer net are fixedly connected with each other by using bolts or screws through the through holes to form the multi-layer net unit.

6. The device according to claim 1, wherein the multi-layer net unit is a cubic frame structure, and a plurality of slots are provided on the inner side of at least one side surface of the cubic frame; the width, depth and shape of the slot are configured to match with the thickness of the net frame of the collecting net, the intermediate layer net and the bottom layer net, which is for inserting the collecting net, the intermediate layer net and the bottom layer net; a structure of preventing the collecting net, the intermediate layer net and the bottom layer net from dropping out from the cubic frame is set on the bottom surface of the cubic frame, and the top surface of the cubic frame is openable.

7. The device according to claim 1, further comprising a holder; one end of the holder is fixed end for embedding underground to fix the entire device; the other end of the holder is free end for supporting the multi-layer net unit; after the multi-layer net unit is connected with the free end of the holder, the plane of net face of the collecting net, the intermediate layer net and the bottom layer net is ensured to be perpendicular to ground.

8. The device according to claim 7, wherein the height of the holder can be adjusted.

9. The device according to claim 7, wherein said holder is tubular structure; the section near the fixed end of the tubular structure is inner tube, and the section near the free end of the tubular structure is outer tube; one end of said inner tube is said fixed end, and the other end is used for be sheathed into said outer tube; the tube wall of the inner tube and the outer tube is axially distributed with a plurality of through holes, through which the inner tube and the outer tube are connected by means of bolts/screws fixing, and the height of holder being adjustable is realized.

10. The device according to claim 1, wherein the thickness of the net frame of the collecting net, the intermediate layer net and the bottom layer net is 3 cm-5 cm; the material of the collecting net is plastic or plastic cement, the radial width of its net frame is less than 3 mm, and its mesh is a square with side length of 1.5 cm; the intermediate layer net is made of metal, and its mesh is square with a side length of 1 mm-5 mm; the bottom layer net is made of metal or gauze, and its mesh is square with side length less than 0.5 mm; said plant seeds are wetland plant seeds.

11. A method for harvesting wind-borne plant seeds, characterized in that, at least one of said device according to claim 1 is used during harvesting process.

12. The method according to claim 11, wherein said plant seeds are wetland plant seeds; the device is mounted vertically in a wetland substrate and the height of the multi-layer net unit of the device is maintained consistent to the height of the wetland plants by adjusting the height of the holder.

13. The method according to claim 11, wherein during the harvesting process, a plurality of said devices are mounted, and the side of the collecting net of said device is configured towards the direction of wind blowing as much as possible; said device is installed on the shore of the wetland.

14. The device of claim 3, wherein a distribution distance between each cluster of the elastic hard fibers around the mesh of the collecting net is 3 mm; and the elastic hard fiber is nylon yarn; its length is about 1 cm.

* * * * *